Figure 3:
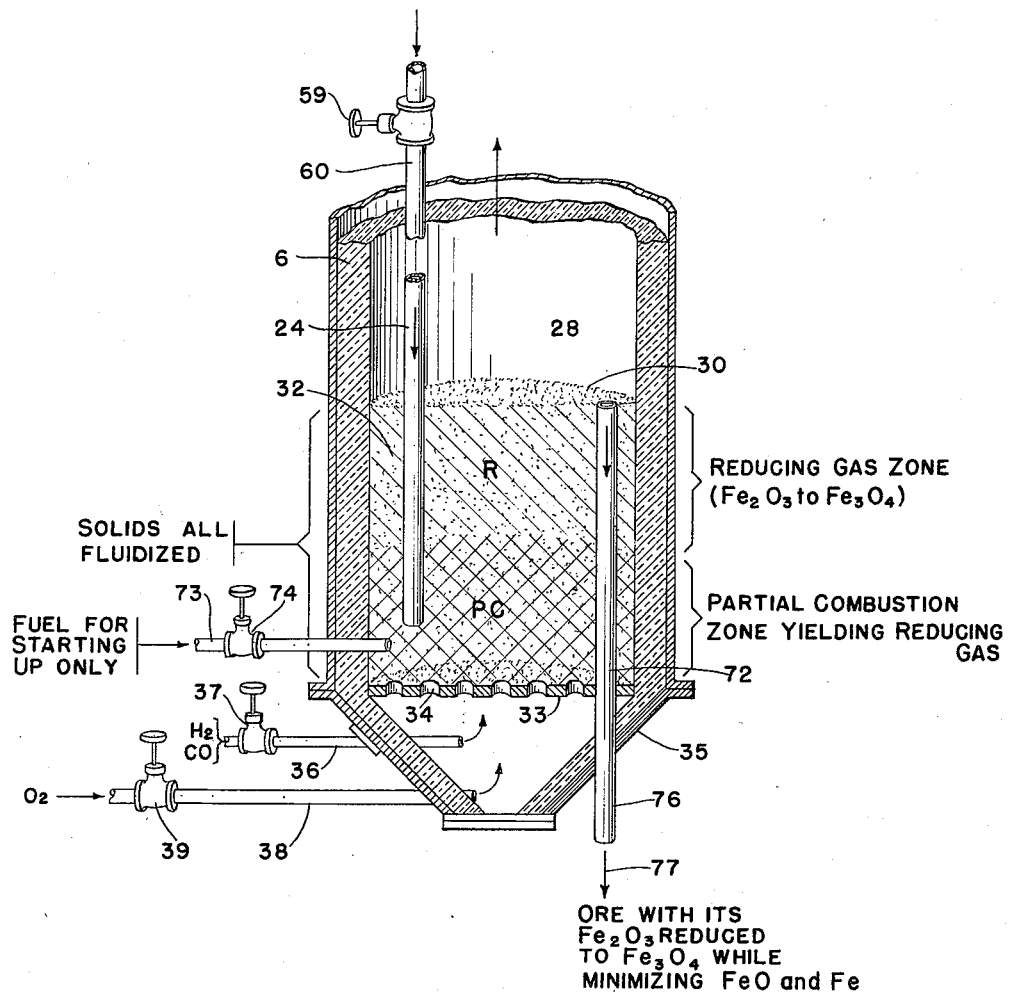

May 13, 1952
T. D. HEATH
2,596,954
PROCESS FOR REDUCTION OF IRON ORE TO MAGNETITE
Filed June 6, 1947
2 SHEETS—SHEET 1
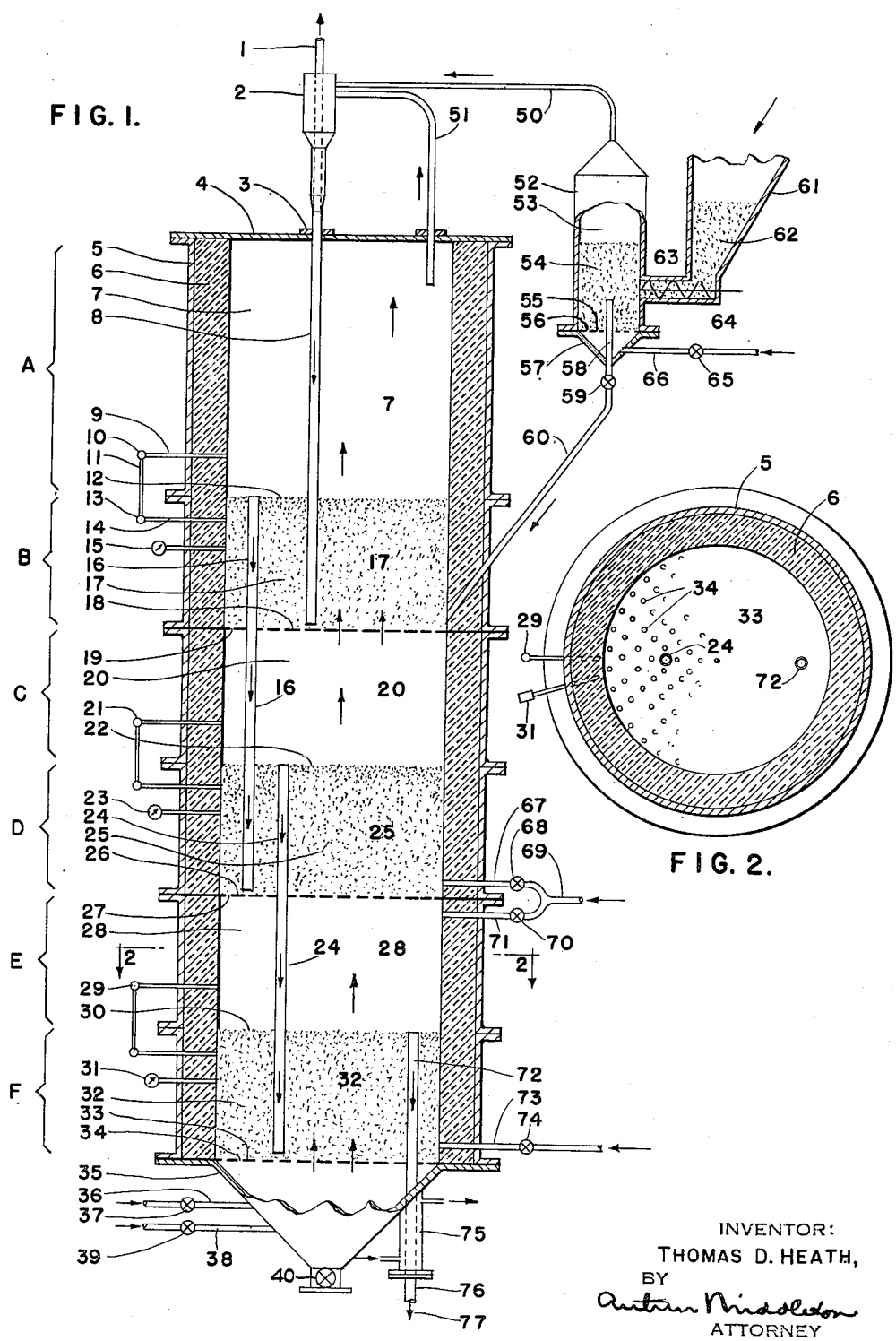
INVENTOR:
THOMAS D. HEATH,
BY
ATTORNEY May 13, 1952     T. D. HEATH     2,596,954
PROCESS FOR REDUCTION OF IRON ORE TO MAGNETITE
Filed June 6, 1947     2 SHEETS—SHEET 2

INVENTOR:
THOMAS D. HEATH,
BY
ATTORNEY

Patented May 13, 1952

2,596,954

UNITED STATES PATENT OFFICE 2,596,954

PROCESS FOR REDUCTION OF IRON ORE TO MAGNETITE

Thomas D. Heath, Westport, Conn., assignor to The Dorr Company, Stamford, Conn., a corporation of Delaware Application June 6, 1947, Serial No. 752,933

3 Claims. (Cl. 23—200)

This invention relates to the reduction of iron ore whereby certain of its iron-bearing constituents and especially its ferric oxide constituents are reduced or converted to magnetite while in dense suspension in an upflowing stream of heating and reducing gas. Under such conditions the suspended solids act like a fluid. More specifically, it relates to the reduction of these ores in a fluidized bed in which both oxidation and reduction are caused to occur at one and the same time in the same fluidized bed.

In accordance with the broader phases of the present invention, the ore to be reduced is first converted into a granular or powder form and the resulting powder or granules thereafter discharged into a reaction chamber through which the treatment gas passes upwardly at a velocity controlled with respect to the density and size of the ore particles so that the particles within the chamber are maintained in a dense, turbulent state without permanently entraining the ore particles or granules in the gas stream.

It is known that by properly regulating the velocity of the gases rising upwardly through a reaction chamber, the ore particles are suspended and made to assume the character of a boiling liquid and to possess fluid properties capable of seeking their own level and otherwise conforming to hydrostatic principles. For example, it is known that when passing a stream of gases upwardly through a mass of subdivided ore solids having particle sizes ranging up to minus 14 mesh screen (U. S. Bureau of Standards) in diameter at extremely low velocities, such as of the order of a fraction of a foot per second, the mass of solid material remains stagnant and the gases percolate through the resulting mass. By gradually increasing the velocities of the gases, a point is reached wherein a portion of the finer particles separates into an upper layer which is maintained in a turbulent condition by the upward passage of the gases therethrough, whereas the bottom portion of the mass continues to remain stagnant. As the velocity continues to increase, a greater portion of the solids is carried into the upper turbulent layer until the velocity has reached a point so that the entire layer becomes turbulent.

The present invention utilizes velocities controlled with respect to the density and size of the ore particles to maintain the mass in a dense, fluid, turbulent condition. This turbulent condition prevents channeling of the reducing gas through the mass and also avoids or prevents any tendency of the particles or granules to coalesce or agglomerate into larger masses at the relatively high temperatures employed in the reducing reaction. Furthermore, the turbulent condition of the solids undergoing reduction tends to maintain an extremely uniform temperature condition throughout the entire mass, thus avoiding any localized overheating which might otherwise tend toward inefficient reduction.

The process forming the present invention may be operated either continuously wherein a stream of such ore in granular or powder form is continuously passed into the reaction or reactor chamber and the reduced material continuously withdrawn therefrom, or it may be operated in a discontinuous manner in which batches of ore are successively treated, as hereinafter described.

When operating the process continuously, the ore is passed thru a plurality of zones of which one or more are heating zones in which the ore is heated to reduction temperature before being reduced in a reduction zone. A special feature of this invention is that both a heating or combustion and a reducing zone exist in the fluid bed of one of the compartments of the reactor. Following reduction of the ore, the treated material may be passed thru a cooling zone.

Therefore, this invention proposes to have a multi-compartment reactor wherein an upper mobilized bed of ore particles is preheated by latent and sensible heat, from which the hot ore drops to a reduction chamber or zone therebelow which is maintained under reducing conditions. From the preheating chamber above the reducing chamber, the fluidized heated ore particles are caused to overflow automatically and continually through a downflow or dip-pipe into the reducing chamber therebelow, and the influent end of the downflow pipe is used to determine the effective "fluid" level above which suspended solids in the preheated fluid bed cannot go. There is thus effected counter-current treatment of down-flowing solids by upflowing gases.

Another feature of the invention is the use of the same kind of "fluid" level control of the bed in the reduction treatment which is the function of the downflow pipe through which reduced material is removed from the reducing chamber.

Still another feature of this invention is the method of feeding the ore-starting material into the preheating bed which comprises a down pipe in which solids are also maintained fluidized or mobilized, extending from outside of the reactor down and close to the bottom of the fluidized preheated bed.

Another significant feature of this invention is the maintenance of two superposed compartments such that in the upper compartment the fluid bed is a combustion zone wherein combustible gases are burned with oxygen-bearing gases and in the lower compartment the upper part of the fluid bed is a reduction zone wherein ore is reduced by reducing gases while the lower part of the fluid bed is a combustion zone wherein combustible gases are burned with oxygen-bearing gases.

A further feature of this invention resides in the manner in which the ferric oxide constituents of the iron ore are reduced to magnetite. Ore which has been partially or totally heated to reduction temperature enters the gas-combustion, ore-reduction chamber preferably at a point near the bottom of the fluid bed in the gas-combustion zone. To the bottom of the fluid bed there are also supplied two gases; a gaseous fuel containing reducing constituents such as hydrogen and carbon monoxide which may be termed a combustible-constituent-containing reducing gas, and an oxygen-bearing gas such as air in limited amounts. These two gases mix and burn as they rise thru the bottom part of the fluid bed, i. e., they burn or combustibly react in the gas-combustion zone which extends from the bottom of the fluid bed to the point where no more oxygen exists in the uprising gases. The heat provided by this combustion serves to heat the incoming gases and perhaps the incoming solids. The ratio of gaseous fuel to oxygen-bearing gas introduced to the bottom of the fluid bed is such that after all the oxygen has been used up in the gas-combustion zone the uprising gas contains hydrogen and steam, and carbon monoxide and carbon dioxide in such ratios that it will reduce ferric oxide in the ore to magnetite, but not to ferrous oxide or metallic iron. This uprising reducing gas from the gas-combustion zone reduces the hot ore particles in the upper part of the fluid bed, i. e., in the ore reduction zone, according to the following chemical reactions:

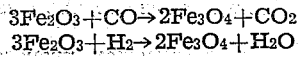

$$3Fe_2O_3 + CO \rightarrow 2Fe_3O_4 + CO_2$$
$$3Fe_2O_3 + H_2 \rightarrow 2Fe_3O_4 + H_2O$$

The reactions which are avoided are:

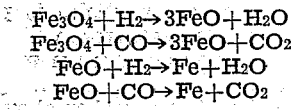

$$Fe_3O_4 + H_2 \rightarrow 3FeO + H_2O$$
$$Fe_3O_4 + CO \rightarrow 3FeO + CO_2$$
$$FeO + H_2 \rightarrow Fe + H_2O$$
$$FeO + CO \rightarrow Fe + CO_2$$

At the same time this control of the composition of the reducing gas is exercised, it must be recalled that the total volume of supplied gas must be continued to meet the requirement of maintaining the ore fluidized. This total volume must be enough to keep the solids fluidized and the criterion of the volume I have adopted is a space rate velocity. Space rate is used because it is important to measure the velocity of the gas through a space substantially free of suspended solids. The reason for this is that the velocity through suspended solids is not absolute, for it will vary in proportion as solids are present. Therefore, I prefer to measure the velocity of the gas through the atmosphere or freeboard space above the fluidized bed, as is common in the art.

Also at the same time that the composition of the reducing gas is controlled and the total flow of gases to the reactor is controlled, the rate of feed of crude ore to the reactor is so adjusted to the flow rates of the gases to the reactor that there are enough reducing gases to perform the required reduction of hematite to magnetite in the ore-reduction zone and enough combustible gases to provide the heat required for the process when burned with oxygen-bearing gases in the gas combustion zones.

The best embodiment of the invention known to me is illustrated in the accompanying drawings which should be taken as informative rather than limitative for the invention obviously may be carried out in modified instrumentalities. In the accompanying drawings, Fig. 1 shows a vertical sectional view, while Fig. 2 is a transverse horizontal view taken along the line 2—2 in Fig. 1 when the reactor is empty. Figure 3 is a partial isometric view of the combined combustion and reduction zone or bed in which all the solids are in turbulent fluidized condition but in which zones of different gas conditions R & PC are indicated.

In the drawings, the total assembly, called a reactor, is preferably a vertical cylinder made up of sections, such as A, B, C, D, E, F, etc. suitably secured together, each having a metal outer wall 5, lined with insulation and firebrick 6. The reactor has a top 4, and a coned bottom 35 provided with a valved outlet 40. Section B is provided with a constriction plate 18 having a plurality of orifices 19. The plate extends across the reactor throughout its cross sectional area and is adapted to hold thereon a bed 17 of fluidized ore being heated by heat transfer, above which is a freeboard space 7. Section D has a similar constriction plate 26, with orifices 27, and adapted to hold a bed 25 of fluidized ore being treated, above which is a freeboard space 20. Section F has a further constriction plate 33 with orifices 34, adapted to hold a bed 32 of fluidized ore being reduced, above which is a freeboard space 28.

The top fluidized bed 17 has its "fluid" level 12 controlled by the entrance to a conduit or dip-pipe 16, down which ore drops into the next lower bed 25, since the outlet end of the dip-pipe 16 terminates slightly above the constriction plate 26.

Similarly, the top of the fluidized middle bed 25 has its fluid level 22 controlled by the entrance to a conduit or dip-pipe 24, down which ore drops into the bottom bed 32, since the outlet of the dip-pipe 24 terminates adjacent the constriction plate 33. The fluid level 30 of the bottom bed 32 is likewise controlled through the medium of conduit or dip-pipe 72 down which ore passes to discharge at 77 through pipe 76 which has associated with it a cooling device 75 which is a heat-exchanger. Dust rising from the top bed 17 tends to pass upward through pipe 51 leading upwardly through a sealed closure in the top 4 of the reactor to a cyclone 2 having an exhaust pipe 1. Solids separated by the cyclone 2 drop back into the reactor by down-pipe 8 extending through seal 3 in the top 4 of the reactor as shown.

A gas rich in reducing constituents such as $H_2$ and CO is supplied to the reactor through an inlet pipe 36 at the bottom thereof, suitably valved as at 37 while oxygen-bearing gas is supplied through inlet pipe 38, suitably valved as at 39. The volume of supplied gas is sufficient to fluidize the ore particles in all of the beds thereabove. Exhaust gas passes upwardly through pipe 51 to the cyclone 2, and dust collected by the cyclone is returned to the top bed 17 through the return pipe 8.

Ore 61 to be treated in reactor is supplied to the hopper 62 whose bottom is laterally extended at 63 to house a screw or other conveyor 64 for impelling the ore into the feed fluidizing tank or chamber 52. This chamber is adapted to hold a bed 54 of fluidized feed ore supported on a constriction plate 55, having orifices 56. The plate 55 is located in the chamber just above its tapered or coned bottom 57. Above the fluidized bed of feed ore is provided a freeboard space 53, and the top of the chamber 52 has a pipe 50 leading to the cyclone for conveying thereto any dust rising in the freeboard space 53. Fluidizing gas for the bed 54 is supplied to the coned bottom 57 of the tanks and beneath the constriction plate 55, through a pipe 64, suitably valved as at 65. An ore discharge pipe 60 terminates in the bed 54 at some height intermediate the bed, and conducts fluidized feed ore to the top bed 17 of the reactor near the bottom of that bed. This pipe 60 is suitably valved as at 59.

In order to supply air, when needed, to the intermediate bed 25 in section D for maintaining that bed as a combustion or oxidation zone, there is provided an air supply pipe 69 connected with a manifold, the ends of which are connected respectively with a pipe 67 leading through the reactor wall into the bed 25, and a pipe 71 leading through the reactor wall to the freeboard space 28 in section E. Pipe 67 is suitably valved as at 68, and pipe 71 is suitably valved as at 70—or possibly there could be only one valve on the air supply pipe 69.

A pipe 73, suitably valved as at 74 and provided with a burner, is supplied for the bottom bed 32 in section F, to supply fuel for starting up. The latter bed comprises a combination gas-combustion and ore-reduction zone where the gas-combustion takes place in the bottom zone PC of the bed and the ore-reduction takes place in the top zone R of the bed. The numeral 15 represents a thermometer or other heat measuring instrument to indicate the temperature of the bed 17. Similar instruments are represented by the numerals 23 and 31 in beds 25 and 32 respectively.

10, 11, 13 and 14 represent pressure comparing instruments associated with bed 17 and freeboard space 7, for measuring the pressure in bed 17 as compared with the pressure in freeboard 7. If the bed 17 showed the same pressure as the freeboard space 7, it would show that the bed was dead and not fluidized. So the pressures are compared to indicate the extent to which the bed 17 is fluidized as well as the depth of the bed. Similar instruments are provided for the beds 25 and 32 which are shown but indicated generally by the reference numerals 21 and 29 respectively.

*Operation*

Assuming that the reactor is in full and continuous operation, the bottom bed 32 is generally the hottest and is the place in whose bottom section PC partial combustion of the incoming combustible gases such as CO and $H_2$ takes place due to the introduction of an oxygen-bearing gas such as air thereinto through the pipe 38. In bed 32 the temperature is controlled so that the ore in the bed is maintained hotter than 500° C. and preferably of the order of 750° C. but not higher usually than 1000° C. Even temperature is maintained throughout bed 32 by rapid circulation of solid particles between the gas-combustion zone PC of bed 32 and the ore-reduction zone R. Section R of bed 32 is where ferric oxide constituents of the ore are reduced to magnetite before the ore leaves the bed by overflow pipe 72. It is to be noted that in the practice of this invention ore-reduction takes place in the upper zone R of the lowest bed 32 while at least partial combustion or oxidation of the incoming combustible gases takes place in the lower zone PC of the same bed. Although these two steps are carried out concurrently in the same bed, they are maintained functionally separate.

The middle bed 25 comprises a gas-combustion zone in which the remaining combustible components of the gas uprising from the bed below are combusted by an oxygen-bearing gas such as air introduced through pipe 69. The temperature of bed 25 is maintained high enough so that essentially complete combustion of the gases is obtained in the bed.

Ore in the top bed 17 gets a preliminary heating due to heat rising from the middle of bed 25, so the ore in bed 17 is pre-heated by sensible heat before it drops through dip-pipe 16 into the middle bed 25 where the ore is subjected to latent heat predominantly since heat is generated in that combustion zone.

With these conditions obtaining, the ore fed to to the top bed is preheated by hot gases rising from the middle bed 25 wherein the preheated ore is to be heated to at least the temperature at which the combustible gases uprising from freeboard space 28 of the chamber below can be combusted by the oxygen-bearing gas introduced to fluid bed 25 by pipe 69. The ore in fluid bed 25, heated wholly or partly to reduction temperature, then falls to the bottom bed 32 where it is first heated the rest of the way to reduction temperature and then reduced to the magnetite stage. Treated ore wherein hematite or other $Fe_2O_3$ constituent has been reduced to magnetite finally passes from the reactor through the dip pipe 72, and discharge pipe 77, during progress through which the ore is cooled for minimizing reversion of the magnetite. The magnetite is then separated from the residue by known methods. Factors of substances input to the reactor must be so correlated that gas combustion takes place in middle bed 25 with essentially no ore reduction while gas combustion takes place in the lower section PC of bed 32 and ore reduction takes place in the upper section R of the same bed. Reduction in any event takes place under conditions such that the production of uncombined FeO or Fe is avoided.

For this reason, reduction of ferric oxide to magnetite in the bottom bed 32 is effected by feeding an excess of reducing gas through the pipe 36 and an oxygen-bearing gas through the pipe 38 into the coned bottom of the reactor, from whence it rises through the orificed constriction plate 33 that supports bed 32 into fluid bed 32 in the lower section PC of which all the oxygen in the gas is used up by combustion and in the upper section R the remaining reducing gas reduces the ore. The gas is supplied in such volume and at such velocity that the ore in bed 32 is maintained mobilized and fluidized, namely, turbulent and in full teeter, so that the ore particles are in suspension in the rising gas and act like a fluid. As the ore particles rise above the level 30 of the dip-pipe 72 they flow into and down that pipe, so that a "fluid" level is maintained in the bed 32 at substantially the elevation of the influent end of that pipe. As the fluidized ore particles rise, an expansion space or freeboard 28 is provided above the bed for minimizing inadvertent passage of suspended particles upward into the middle bed 25. This freeboard space has been found to operate satisfactorily if it is about as high as the bed is deep, and in practice both of these have been made two to five feet in depth. Oxidizing gas is supplied through pipe 38 where it mixes with the reducing gas in the coned bottom 35 to make a combusting mixture—but with a substantially excess over combusting requirements of the reducing gas.

The total gas supplied through the pipes 36 and 38 should be such that its passage through the bed 32 should be at a "space rate" velocity of between 0.50 to 1.50 feet per second depending upon the particles size and density of the material being treated. Space rate is the velocity of the gas through space, namely, through the fluidized bed ignoring the volume occupied in the solids, or through the freeboard space 28 overlying the bed. At a velocity less than substantially 0.50 the ore solids are not well mobilized, and at a velocity greater than 1.50, dust loss is excessive. The characteristics of the reducing gas are important as previously described in this specification, namely in general there must not be enough hydrogen to yield an appreciable amount of water with oxygen from the ore and there must not be enough carbon monoxide to yield an appreciable amount of carbon dioxide with oxygen from the ore. The exact requirement for these gases is shown in my Patent No. 2,477,454, of which this application is a continuation-in-part.

In the gas-burning or gas-combustion zone (bed 25) the depth of bed 25 and freeboard space 20, correspond to those in the bottom section, namely two to five feet each. Sufficient air must be supplied to the bed 25 to burn essentially all of the combustibles in the gas uprising from bed 32 below.

In bed 25, the solids are fluidized by the products of combustion of the excess reducing gas from bed 32 and the oxygen-bearing gas introduced through 69, and rise to the freeboard space 20, from whence they flow down dip-pipe 24 into fluid bed 32, and the level of bed 25 is thus automatically maintained at substantially the elevation of the influent upper end of the pipe 24. Gas rising from bed 25 passes through constriction plate 18 of the upper preheating bed 17 at sufficient velocity to maintain the solids of that bed also in fluidized condition. This is preferably likewise five feet in depth, but the freeboard space 7 thereabove is usually ten feet in depth for minimizing dust losses. Thus the freeboard space may be a height equal to from one and one-half to two times the depth of the fluidized bed. Fluidized solids from this bed flow down dip-pipe 16 to the bed 25 below, in a preheated condition due to transfer of heat thereto by the rising gases. Neither oxidation nor reduction takes place in this bed. Gases and dust entrained therein exhaust upwardly through pipe 51 to the cyclone 2, wherein dust is caught and returned to bed 17 through pipe 51, while the gases exhaust through pipe 1 to waste, or for re-use, as the case may be. It is to be noticed that this apparatus makes use of the counter-current principle in that the ore progresses generally downwardly while the treating gas progresses upwardly. However, in each bed the ore is supplied to the bottom section thereof which means that each ore particle must rise from the place whereat it is supplied to the bed, to at least the elevation of the entrance of the dip-pipe or down pipe for conducting the ore to the next lower bed, or to discharge, as the case may be. To this extent, co-current operation is used. At any rate, this method of passage of the ore in a bed discourages by-passing or short circuiting of the ore before being properly treated within each bed. Also localized over or under heating is minimized.

Ore 62 is continually supplied to the reactor for treatment therein, preferably by being supplied to the hopper 61 from whence it is impelled by screw conveyor 63, or other suitable means, into feed tank 52 wherein there is maintained another bed 54 of fluidized ore supported from a constriction plate 56 having orifices 56. Fluidized ore descends through dip-pipe 60 to pass as feed, into the preheated bed 17. Ore is supplied at a range of rates from 10 to 200 pounds per hour per square foot of cross-sectional area of the reactor.

The depth and temperature of the bottom bed 32, should be so adjusted that when about 95% to 100% of the ferric oxide is reduced to magnetite, the exit gases rising from this bed will contain the desired potential and sensible heat that will be required in beds 25 and 17.

In starting up, before any ore has been supplied to the reactor, oil is fed to pipe 73 and its burner provided for bottom bed 32 is lighted. Air is supplied to that bed through pipe 38 to permit combustion to take place. When the reactor is hot enough, ore is then fed thereto and the burner is turned off, as well as part of the air supply 38.

The constriction plates are made of heat-resistant metal or other material and are sufficiently strong to support their burden of ore particles being treated, without substantial warping or distortion. The orifices in the constriction plates are sized and spaced so as to assure that substantially all ore particles of the bed supported by the plate are fluidized and that neither channeling takes place nor that some of the particles lie dead on the plate.

Whereas only three beds have been shown, of which the top one is a preheating chamber, the middle one is a gas-combustion chamber, and the bottom one is a combination gas-combustion and ore-reduction chamber, the preheating chamber could be made multi-stage. That is, preheating of the ore could take place successively in two or more preheating chambers. Indeed, if economy is unimportant, the preheating chamber could be eliminated for the basic concept of this invention requires only two chambers for the heating and reduction of the ore. Initial starting up has been shown to be by the use of an oil burner, but obviously other means of initial heating of the reactor could be used.

This proposal of using a combination partial gas-combustion and ore-reduction zone or bed can only be used in connection with iron ore that reduces rapidly, that is, in the time that it takes for the ore to travel from the gas-combustion zone PC through the ore-reduction zone R to the overflow pipe 72.

This application is a continuation-in-part application stemming from my patent application Serial No. 554,201, filed September 15, 1944, now Patent 2,477,454, issued July 26, 1949.

I claim:

1. The continuous process for the reduction of iron-bearing constituents of finely-divided iron ore solids to magnetite, which comprises establishing and maintaining within an enclosed chamber an everchanging bed of such solids by feeding such solids to a lower section of such bed and conducting solids from an upper section thereof, maintaining the solids of such bed as turbulently mobilized solids by passing therethrough an uprising stream of fluidizing gas at fluidizing velocities, supplying free-oxygen to a lower section of the bed, supplying an uprising stream of combustible reducing gas to a lower section of the bed in an amount sufficient to combustibly react with substantially all of the supplied free-oxygen while leaving residually in such uprising gas stream sufficient reducing gas to reduce ore solids in an upper section of the bed substantially to magnetite, and reducing ore solids in such upper section before conducting them therefrom by controlling the quantity of free-oxygen supplied to the bed to be such an amount that when substantially combustibly reacted with combustible reducing gases will liberate sufficient heat to maintain such solids at reducing temperatures whereby they will be reduced by the action of the residual uprising reducing gas.

2. The process according to claim 1, wherein the reducing gas components comprise hydrogen and carbon monoxide.

3. The process according to claim 1, wherein the oxygen supply is controlled to between that amount which will heat the bed to reducing temperature and that amount which will cause fusion of the particles.

THOMAS D. HEATH.

REFERENCES CITED

The following references are of record in the file of this patent:

UNITED STATES PATENTS

| Number | Name | Date |
| --- | --- | --- |
| Re. 21,526 | Odell | Aug. 6, 1940 |
| 1,987,278 | Wilson | Jan. 8, 1935 |
| 2,217,235 | Reiser | Oct. 8, 1940 |
| 2,304,128 | Thomas | Dec. 8, 1942 |
| 2,358,039 | Thomas et al. | Sept. 12, 1944 |
| 2,449,635 | Barr | Sept. 21, 1948 |
| 2,477,454 | Heath | July 26, 1949 |

OTHER REFERENCES

Mellor: "Comprehensive Treatise on Inorganic and Theoretical Chemistry," vol. 13, page 813, Longmans, Green & Co., N. Y. C., 1934.

Wetherill: "Ind. and Eng. Chem.," vol. 26, No. 9, pages 983–985.